Patented July 12, 1938

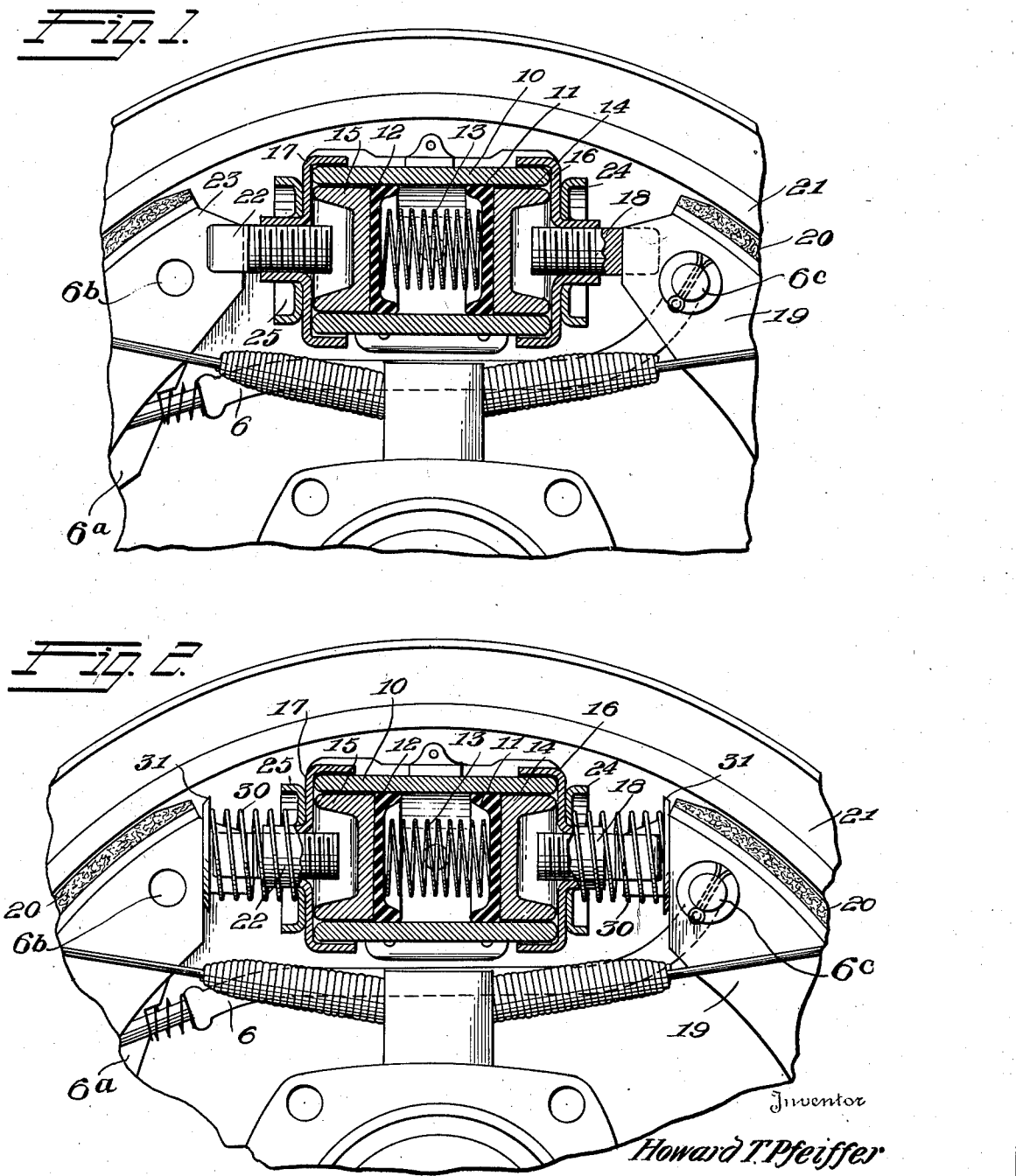

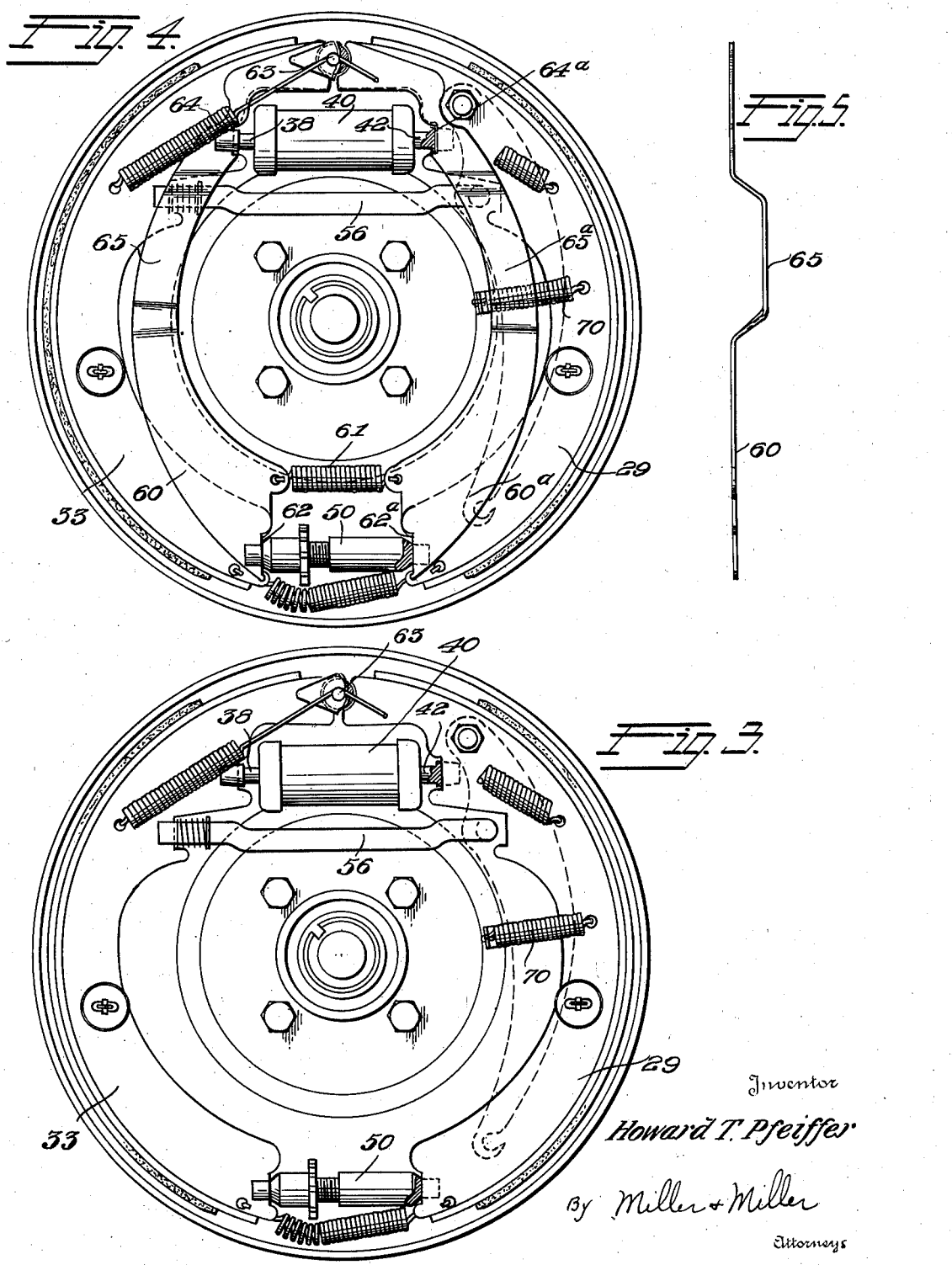

2,123,379

UNITED STATES PATENT OFFICE 2,123,379

BRAKE

Howard T. Pfeiffer, Woodlawn, Md.

Application January 5, 1938, Serial No. 183,554

4 Claims. (Cl. 188—152)

The present invention relates to brakes, and primarily to an hydraulic brake provided with auxiliary means for optionally mechanically applying the brake shoes.

More particularly the invention pertains to hydraulic brakes, and to means for preventing the collapse of the movable rubber piston cups of the motor cylinders which move the brake shoes into engagement with the brake drum, the latter being located on a vehicle wheel.

It is now common practice in various popular makes of automobiles to employ hydraulic brakes and to provide mechanical means for optionally operating the brake shoes of the rear brakes, said mechanical means being operated by the hand or emergency brake lever. With such an arrangement it has been found that air leaks into the hydraulic system and it is the primary object of this invention to cure this defect.

Other aims and objects will be apparent from the detailed description hereinafter appearing, when taken in conjunction with the appended drawings, to which reference is now made, and in which:

Fig. 1 is an elevational view, partly in section, showing a brake operating motor cylinder and adjacent mechanism, as now commonly employed.

Fig. 2 is a view similar to Fig. 1 with the invention applied thereto.

Fig. 3 is an elevational view of another type of brake also now commonly employed.

Fig. 4 is a view similar to Fig. 3 with a modified form of the invention applied thereto, and, Fig. 5 is a side elevational view of one of the spring pressed keeper plates employed in the construction of Fig. 4.

In an hydraulic brake system it is desired at all times to have sufficient pressure within the system to prevent air being drawn therewithin. It is now customary in various hydraulic brake systems to actuate the brake shoes of the rear wheel brakes by a series of levers and cables controlled by the hand or emergency brake lever. In actuating the brake shoes by this means, which is independent of the hydraulic system, there is left no support for the movable rubber piston cups normally employed in the motor cylinder which hydraulically operates the brake shoes. These cups are forced outwardly by a spring positioned therebetween, thus causing reduced pressure within the hydraulic system and bringing about a collapse of the aforementioned rubber piston cups. When this occurs air will seep into the hydraulic system causing reduced efficiency of the brakes and the frequent necessity of adjusting, that is bleeding, the system.

Referring first to Fig. 1 of the drawings there is shown a portion of the hydraulic system, namely the motor cylinder 10, the two oppositely disposed movable rubber piston cups 11 and 12 and the interposed spring 13. In contact with the rubber piston cup 11 is a piston member 14, and in contact with the piston cup 12 is a similar piston member 15. The opposite ends of the cylinder 10 are provided with apertured caps or covers 16 and 17. Threaded within the cover 16 is a rod 18 provided with a slot within which the brake shoe 19 loosely engages, the latter having a brake lining 20 for engaging the brake drum 21. Similarly the cap 17 threadedly engages a rod 22, which latter has a slot into which the brake shoe 23 loosely fits. The cap 16 is provided with an adjusting disc 24 and the cap 17 with a similar adjusting member 25. The construction so far described is that of a well-known motor cylinder operating mechanism of an hydraulic brake system.

The brake shoes 19 and 23 are adapted to be operated by mechanical means comprising a lever 6ª pivoted to brake shoe 23 at 6ᵇ. One end of a rod 6 is pivoted to brake shoe 19 as at 6ᶜ, the opposite end of rod 6 being provided with a slot within which the lever 6ª loosely fits. Upon actuation of the lever 6ª to the right, as viewed in Figs. 1 and 2, there follows a spreading of brake shoes 19 and 23. When this occurs there will be no means preventing outward movement of the cylinder covers 16 and 17. The spring 13 will move these covers by actuating the pistons 14 and 15. This produces a reduced pressure within the hydraulic system and causes a collapse of the rubber piston cups 11 and 12 so that air will seep into the system around the end edges of the cylinder 10 and about the collapsed rubber piston cups. By referring to Fig. 2 of the drawings it will be seen that a spiral spring 30 is provided intermediate each cylinder cover 16, 17 and its brake shoe, which spring exerts a slightly greater force than the spring 13 within the cylinder 10. A centering disc 31 is employed for holding each spring 30 in position intermediate a brake shoe and a cylinder cover. Accordingly the springs 30 stop the tendency toward outward movement of the cylinder covers when the brake shoes are mechanically actuated and thus prevent the collapse of the rubber piston cups, for the reasons above stated.

Referring now to Fig. 3 there is shown in elevation another common form of brake, the brake shoes being designated by the numerals 29 and 33 and the hydraulic brake motor cylinder of internal construction as shown in Figs. 1 and 2, by the numeral 40. An adjusting screw 50 is provided for the shoes 29 and 33, and the cylinder 40 has a pair of piston actuated rods 38 and 42 corresponding to the rods 18 and 22 of the form of the invention shown in Figs. 1 and 2. The brake shoes may be mechanically actuated by the hand or emergency brake lever of an automobile or other vehicle through the rod 56.

For preventing the collapse of the rubber piston cups in the brake motor cylinder 40 there are provided two similar spaced oppositely disposed keeper plates 60, 60ᵃ interconnected by a spring 61. Each keeper plate 60, 60ᵃ is pivoted on an end of the adjusting screw 50 as at 62, 62ᵃ and on an anchor pin 63 of the brake. Also each plate 60, 60ᵃ is provided with a notch 64, 64ᵃ which receives the slotted end of one of the piston actuated rods 38 or 42. Each plate 60, 60ᵃ is outwardly offset as at 65, 65ᵃ to clear the rod 56 and spring 70 of the brake. The force exerted by the spring 61 on the rods 38 and 42 is slightly greater than that of the spring within the cylinder 40. The keeper plates do not interfere with the normal hydraulic action of the brake shoes but upon mechanical actuation thereof movement of the piston actuated rods 38 and 42 is prevented by the force exerted by the spring 61 through plates 60, 60ᵃ.

From the above description it will be apparent that means has been provided to effectively cure a defect in brakes actuated by combined hydraulic and mechanical means and it is contemplated to cover any obvious modifications of the invention as will be apparent to those skilled in the art and to be limited in this respect only as may be necessary by the scope of the claims hereto appended.

What I claim as new and desire to secure by Letters Patent of the United States is:—

1. In a brake mechanism, brake shoes, an hydraulic system including a cylinder having a pair of movable rubber piston cups therein, spring means intermediate said cups, pistons actuated by said cups, a rod actuated by each piston loosely engaging a brake shoe, means for mechanically operating said brake shoes, and means resisting outward movement of said cups upon mechanical actuation of said shoes.

2. In a brake mechanism, brake shoes, an hydraulic system including a cylinder having a pair of movable rubber piston cups therein, spring means intermediate said cups, pistons actuated by said cups, a rod actuated by each piston loosely engaging a brake shoe, means for mechanically operating said brake shoes, and spring operated means resisting outward movement of said cups upon mechanical actuation of said shoes.

3. In a brake mechanism, brake shoes, an hydraulic system including a cylinder having a pair of movable rubber piston cups therein, spring means intermediate said cups, pistons actuated by said cups, a rod actuated by each piston loosely engaging a brake shoe, means for mechanically operating said brake shoes, and spring means intermediate said shoes and pistons resisting the outward movement of said cups upon mechanical actuation of said shoes.

4. In a brake mechanism, brake shoes, an hydraulic system including a cylinder having a pair of movable rubber piston cups therein, a spring intermediate said cups, pistons actuated by said cups, a rod actuated by each piston loosely engaging a brake shoe, means for mechanically operating said brake shoes, and spring means exerting a greater force than said first mentioned spring resisting the outward movement of said cups upon mechanical actuation of said shoes.

HOWARD T. PFEIFFER.